(12) United States Patent
Gu et al.

(10) Patent No.: US 11,627,135 B2
(45) Date of Patent: Apr. 11, 2023

(54) METHOD AND SYSTEM FOR DELIVERING RESTRICTED-ACCESS RESOURCES USING A CONTENT DELIVERY NETWORK

(71) Applicant: SAP SE, Walldorf (DE)

(72) Inventors: Yuanxun Gu, Munich (DE); Joerg Koenning, Munich (DE); Eduard-Andrei Boamba, Puchheim (DE); Ovidiu Boc, Munich (DE); Yevgen Borodkin, Munich (DE)

(73) Assignee: SAP SE, Walldorf (DE)

( * ) Notice: Subject to any disclaimer, the term of this patent is extended or adjusted under 35 U.S.C. 154(b) by 199 days.

(21) Appl. No.: 16/927,226

(22) Filed: Jul. 13, 2020

(65) Prior Publication Data
US 2021/0400047 A1 Dec. 23, 2021

(30) Foreign Application Priority Data

Jun. 19, 2020 (EP) .................................... 20181032

(51) Int. Cl.
*H04L 29/06* (2006.01)
*H04L 9/40* (2022.01)

(52) U.S. Cl.
CPC ............ *H04L 63/10* (2013.01); *H04L 63/083* (2013.01)

(58) Field of Classification Search
CPC ........................... H04L 67/2942; H04L 63/10
See application file for complete search history.

(56) References Cited

U.S. PATENT DOCUMENTS 8,046,432 B2 * 10/2011 Yoo ..................... H04L 67/2885
709/213
2018/0077222 A1 * 3/2018 Shnitko ................... H04L 67/06
(Continued)

OTHER PUBLICATIONS

"Extended European Search Report", dated Oct. 30, 2020 (Oct. 30, 2020), European Patent Office, for European Application No. 20181032.2-1213, 7pgs.

*Primary Examiner* — Jason K Gee
(74) *Attorney, Agent, or Firm* — Buckley, Maschoff & Talwalkar LLC (57) ABSTRACT

A computer-implemented method for delivering restricted-access resources hosted on an origin server using a CDN comprising a plurality of CDN servers is provided. The method comprises receiving, by a CDN server from a client, a request for a restricted-access resource hosted on the origin server, wherein the request comprises a resource identifier of the restricted-access resource and an authentication token; and performing a delivery step comprising: creating, by the CDN server, a composite cache key comprising the resource identifier and at least part of the authentication token; comparing, by the CDN server, the composite cache key with one or more composite cache keys previously stored at the CDN server; if a match between the composite cache key and one of the previously stored composite cache keys is found, delivering, by the CDN server, a response associated to the composite cache key to the client; if no match between the composite cache key and one of the previously stored composite cache keys is found, performing a retrieval step comprising: forwarding, by the CDN server, the request to the origin server; checking, by the origin server, whether the authentication token allows access to the restricted-access resource; if the access is allowed: retrieving, by the origin server, the restricted-access resource; sending, by the origin server, a response comprising the restricted-access resource (Continued)

to the CDN server; if the access is not allowed: sending, by the origin server, a response comprising a refusal of the request to the CDN server; storing, by the CDN server, the response in association to the composite cache key; delivering, by the CDN server, the response to the client.

15 Claims, 8 Drawing Sheets

(56) References Cited

U.S. PATENT DOCUMENTS

| | | |
|---|---|---|
| 2018/0295214 A1 | 10/2018 | Stevens et al. |
| 2019/0306157 A1* | 10/2019 | Lores .................... H04L 9/3226 |
| 2020/0145422 A1 | 5/2020 | Charvet et al. |
| 2020/0162360 A1 | 5/2020 | Jones et al. |

* cited by examiner

METHOD AND SYSTEM FOR DELIVERING RESTRICTED-ACCESS RESOURCES USING A CONTENT DELIVERY NETWORK

CROSS-REFERENCE TO RELATED APPLICATIONS

The present application claims priority under 35 U.S.C. § 119(a) to EP Patent Application No. 20181032.2, filed Jun. 19, 2020, the contents of which are incorporated herein by reference for all purposes.

DESCRIPTION

Technical Field

The following description relates to employing a content delivery network (CDN) for web services involving resources with restricted access.

Background

A CDN is a geographically distributed system of servers that deliver web content to a client. The CDN caches the content from an origin server so that, when a user requests e.g. a webpage that is part of the cached content of the CDN, a server in the CDN that is closest to the user delivers the content in place of the origin server. The use of a CDN has many advantages, including a reduced latency due to the geographical proximity of the CDN server to the user, a decreased server load since the load is distributed across the plurality of servers, a higher reliability concerning the availability of the content thanks to the redundancy among the servers.

However, content with restricted access, e.g. requiring authorization, is conventionally not suitable to be cached on CDN servers. Accordingly, the advantages of CDNs are conventionally available only for publicly accessible resources.

SUMMARY

Embodiments may provide a protocol for securely and efficiently employing a CDN for restricted-access resources, in particular for restricted-access resources dynamically generated by server-side applications on the basis of client input, wherein the resources are uniquely identifiable.

According to one aspect, a computer-implemented method for delivering restricted-access resources hosted on an origin server using a CDN comprising a plurality of CDN servers is provided. The method comprises:
receiving, by a CDN server from a client, a request for a restricted-access resource hosted on the origin server, wherein the request comprises a resource identifier of the restricted-access resource and an authentication token;
performing a delivery step comprising:
creating, by the CDN server, a composite cache key comprising the resource identifier and at least part of the authentication token;
comparing, by the CDN server, the composite cache key with one or more composite cache keys previously stored at the CDN server;
if a match between the composite cache key and one of the previously stored composite cache key is found, delivering, by the CDN server, a response associated to the composite cache key to the client;
if no match between the composite cache key and one of the previously stored composite cache key is found, performing a retrieval step comprising:
forwarding, by the CDN server, the request to the origin server;
checking, by the origin server, whether the authentication token allows access to the restricted-access resource;
if the access is allowed:
retrieving, by the origin server, the restricted-access resource;
sending, by the origin server, a response comprising the restricted-access resource to the CDN server;
if the access is not allowed:
sending, by the origin server, a response comprising a refusal of the request to the CDN server;
storing, by the CDN server, the response in association to the composite cache key;
delivering, by the CDN server, the response to the client.

The origin server may in particular be a web server, i.e. a computer system that hosts resources that are shared with one or more client devices (also denoted as "clients") as well as web server software. The web server software may comprise software for sharing the resources, e.g. a piece of software that implements the hypertext transfer protocol (HTTP). It may further comprise server-side applications that dynamically generate resources in response to requests from the clients, e.g. by evaluating a variable resource based on input from a client. Accordingly, the resources may be hosted at the origin server in the sense that they are stored therein and/or in the sense that they are produced by server-side applications. The origin server is connected to the Internet and communicates via the Internet with the client devices, using e.g. HTTP.

The origin server and the client devices also communicate with the plurality of CDN servers over the Internet. The CDN servers may also particularly comprise software for sharing resources and their physical locations are distributed around the world. The CDN servers cache the resources hosted on the origin server, i.e. store those resources locally at the CDN servers, in order to replace the origin server when servicing the requests of the client devices. Accordingly, the CDN is used to deliver resources originally hosted on the origin server to the client devices, using e.g. HTTP. The CDN comprises both the CDN servers and the origin server.

A resource is anything that can be identified. In particular, a web resource is anything that can be identified in the World Wide Web. Examples of resources include, but are not limited to, electronic documents, images, text strings and numerical values. According to the Resource Description Framework (RDF) specifications, resources are identified by a uniform resource identifier (URI). The term "uniform resource locator" (URL) refers to the subset of URIs that, in addition to identifying a resource, provide a means of locating the resource by describing its primary access mechanism (e.g., its network "location").

A resource may be variable, in that the entity identified by the URI comprises one or more free parameters, i.e. parameters with no pre-determined values (numerical values, text values . . . ). Accordingly, the resource may have different "realizations" based on how the free parameters are set. As mentioned above, the resource to be provided in response to a retrieval request by a client may be dynamically generated by assigning values to the free parameters of the (variable) resource.

In cases in which the resource is variable, the term "resource" is used herein to refer to both the parametrised form (i.e. no values assigned to the parameters) and the evaluated (or generated) form (i.e. given values assigned to the parameters). Said otherwise, the resource is what is located at the origin server and identified e.g. by the URL. Also, the resource is what is returned in the response to the client, which is based on what is located at the URL and may further vary according to the content of the client request.

A restricted-access resource is a resource that is not generally publicly available to any client sending a request containing the URI of that resource. In other words, access to the resource is only granted if the client is authorized. The restricted-access resource may also be referred to as "authorization-only access resource". The origin server checks that the client has the required privileges to access the requested resource upon receiving the request. For example, the client device may be authorized because the user of the client, as authenticated e.g. via username and password, has the necessary privileges.

A client device sends a request for a restricted-access resource hosted on the origin server. In other words, the client would like to retrieve the restricted-access resource from the origin server. Exemplarily, the requested restricted-access resource may be a resource generated by a server-side application, e.g. a numerical value obtained by evaluating mathematical functions on the basis of an input provided by the client.

In some examples, the resource at the origin server may have been previously provided by a client, which may be the same client that later sends the request or a second client. For instance, a second client may send to the origin server a create request having as body a variable resource, e.g. a set of mathematical functions. Accordingly, in one example, the method may further comprise, before sending/receiving the request, sending, by a second client to the origin server, a request to create the restricted-access resource. The client device may store a client agent, i.e. a piece of software configured to send the request, such as a Web-based application. The communication between the client agent and the web server software on the origin server, specifically with the server-side applications, may occur as specified in an application programming interface (API), in particular a web service. An API is a software interface that allows two applications to interact with each other without any user intervention and comprises a complete set of rules and specifications for an application to follow in order to facilitate the interaction. A web service is an API for cases in which the interaction between the two applications involves communication over a network.

An example of a web service is a RESTful API, i.e. a web service that complies with the constraints set by REST, wherein REST stands for representation state transfer and it is a software architectural style. Two of the six REST constraints are statelessness and cacheability. For statelessness, each request from client to server must contain all of the information necessary to understand the request, and cannot take advantage of any stored context on the server. Cache constraints require that the data within a response to a request be implicitly or explicitly labelled as cacheable or non-cacheable. If a response is cacheable, then a client cache is given the right to reuse that response data for later, equivalent requests. Commonly, a RESTful API uses HTTP as transfer protocol.

The request from the client comprises a resource identifier of the restricted-access resource and an authentication token. The resource identifier may e.g. be the URI of the resource, or, more specifically, the URL of the resource.

The authentication token (also denoted as "access token") is a piece of data containing the access permissions for the client. When serving static content, most of the resources are publicly available and identical regardless of who is accessing them. For web services, access to resources must often be authorized, so that requests include an authentication token, which allows the client to access routes and resources that are permitted with that token. Further to the access permissions, the authentication token may comprise other elements, such as metadata, signatures and so on, which are not relevant for authorization.

Exemplarily, the authentication token may be a JSON Web Token (JWT), i.e. a token according to the open, industry standard RFC 7519, which is a method for securely representing claims between two parties. JSON stands for JavaScript Object Notation and is a data format. A JWT can be signed in order to verify the integrity of the payload contained within it, for example using public/private key pairs, in which case the signature also certifies that only the party holding the private key is the one that signed it.

A JWT consists of three parts separated by dots, which are header, payload and signature. The three parts are encoded separately using Base64url encoding and then concatenated, so that a JWT typically looks like the following: xxxxx.yyyyy.zzzzz. The payload comprises one or more claims, which are statements about an entity (typically, the user of the client) and contain optionally additional data, such as an expiration time.

The way in which the resource identifier and the authentication token are incorporated in the request depends on the communication protocol between client and server. The request may further comprise other elements.

In the case of a RESTful API using HTTP, the request usually comprises the URL path, the HTTP method (i.e. one of GET, PUT, POST, PATCH, DELETE) and, optionally, headers to provide information to both the client and the server, as well as a body that contains data to be sent to the server, e.g. values for parameters that alter how the resource will be returned. In this case, the authentication token is provided via the HTTP authorization header.

The authentication token may be obtained within an authentication flow. In some examples, the method may further comprise generating, by the origin server, the authentication token and sending the authentication token to the client. In particular, the origin server may generate the authentication token in response to a log-in request of the client. Once the user of the client is logged in, each subsequent request will include the authentication token, in some examples until it expires.

The request sent by the client device is received by a CDN server. When an origin server is part of a CDN, a request from a client device containing the resource identifier of a resource at the origin server is always automatically forwarded to one of the CDN servers. Specifically, the request is received by the CDN server that is geographically the closest to the client device.

The method further comprises performing a delivery step. The delivery step comprises creating, by the CDN server at which the client request has been received, a composite cache key comprising the resource identifier and at least part of the authentication token (in particular at least the authorization-relevant part of the authentication token).

Then, the created composite cache key is compared with one or more composite cache keys previously stored at the CDN server, and, if a match between the composite cache key and one of the previously stored composite cache key is found, the CDN server delivers the response associated to the composite cache key to the client.

As mentioned above, the function of the CDN servers is to cache resources from an origin server. In particular, the CDN cache contains one or more entries, wherein each entry comprises the response from the origin server to a client request and it is stored in association with a cache key identifying that particular request. When a request is received at the CDN server, it generates a cache key out of the request and then compares it with the previously stored cache keys. If it finds a match, the CDN server returns the response in the entry associated with that cache key.

Conventionally, CDNs are used mostly with resources that are publicly available and identical regardless of who is accessing them, and the cache key is generated based on the resource identifier of the request.

According to the invention, the CDN server generates, out of a request, a composite cache key that contains not only the resource identifier, but also at least part of the authentication token, specifically at least the part that is necessary for verifying authorization of the client. Thus, after the delivery step herein described is completed for a first-time request, subsequent identical requests can be serviced directly by the CDN server without having to forward the request to the origin server. Thus, the CDN can be advantageously used also for restricted-access resources. It should be noted, as explained later, that the response from the origin server will include the requested resource only if the client is authorized.

In some examples, the composite cache key may comprise the authentication token as a whole. In case the authentication token is a JWT, the composite cache key may comprise the whole Base64url encoded and concatenated string. Exemplarily, the JWT string may be hashed by means of a hash function.

Using the authentication token as a whole when creating the composite cache key on the basis of a first-time request from the client may lead to the following scenarios.

In one scenario, a second, different client may have the same access permissions (e.g. admin level) but a different authentication token overall, because of the other elements in the token that are not relevant for authorization, as mentioned above. The second client requests the same restricted-access resource. The CDN server generates a composite cache key from this request, but, due to the difference in the authentication tokens, this will not match the composite cache key of the entry associated with that resource in the cache. Thus, the request is forwarded to the origin server.

In another scenario, the authentication token may comprise time-dependent information. For example, the authentication token may have an expiration time, indicating a period of validity of the authentication token. After the validity period is over, a new authentication token may be issued for the same client: although the access credentials are the same, the value of the expiration time is different. Accordingly, if the client sends a second request for the same restricted-access resource, the composite cache key generated from this request will not match the composite cache key of the entry associated with that resource in the cache. Thus, the request is forwarded to the origin server.

In order to deal with such scenarios, in some examples, the composite cache key may comprise only a part of the authentication token, i.e. the authorization-relevant part of the authentication token, e.g. the access permissions. The part of the authentication token may also be hashed by means of a hash function.

For instance, if the authentication token is a JWT comprising one or more JWT claims, the composite cache key may comprise only some or all the JWT claims, but not the header and the signature. In this case, the Base64url encoded string may be decoded in order to extract the one or more JWT claims and use a subset of those in combination with the resource identifier to create the composite cache key. The subset may be proper or improper, i.e. coincide with the whole set.

In particular, the one or more JWT claims used for the composite cache key may be only those necessary to check whether the client is authorized to access the requested resource, e.g. a user role (such as "admin"). In particular, the "exp" registered claim may be excluded from the composite cache key, i.e. the claim that identifies the expiration time of the JWT. The one or more JWT claims used for the composite cache key will be denoted as "authorization JWT claims". For example, the authorization JWT claim may be the "sub" registered claim. Additionally or alternatively, authorization JWT claims may comprise other registered claims such as "aud" and/or any private or public claim.

Using only the authorization-relevant part of the authentication token, for example the authorization JWT claims, each subsequent request from the same client or from another client having the same access permissions can be serviced by the CDN server without having to forward the request to the origin server. In this way, it can be avoided that other pieces of information contained in the authentication token, which do not affect access rights, trigger forwarding the request to the origin server, even if the response is actually already cached at the CDN server.

As explained, the composite cache key comprises the resource identifier and at least part of the authentication token. In a particular example, when the request is an HTTP request comprising a body, the composite cache key may further comprise the body.

As mentioned above, the body contains data to be sent to the server, e.g. values for parameters that alter how the resource will be returned. The body option is only used with POST, PUT, PATCH or DELETE methods. It should be noted that some requests using these methods are intrinsically not cacheable. For example, requests with the DELETE method, i.e. requests that trigger the deletion of a resource, will elicit a different response on a subsequent call: resource not found. Similarly, requests using the POST method to create resources, on a second call will elicit a response stating that the resource already exists. On the other hand, POST requests which are meant to call certain server-side applications, e.g. mathematical scripts, will elicit the same response. The delivery method discussed herein involves, of course, only cacheable restricted-access resources.

One example of a non-cacheable POST request is the creation of a variable resource, e.g. a mathematical function with parameters a and b: POST/mathfunctions/pitagoratheorem body="{function:sqrt(a^2+b^2)}". Such a request may be sent by a client to the origin server in order to create the resource, as mentioned above. The same client or another client may subsequently send a retrieval request such as POST/mathffunctions/pitagoratheorem/calculate body={a: 1, b:2}, which is instead cacheable.

If the resource provided by the server varies based on the content of the request body, e.g. a numerical value based on some input values, the caching of the response of the server may be done by taking also the request body into consideration. In particular, the request body may be included in the composite cache key.

Similarly, if the request headers are also known to influence the resource in the response from the service, one or more headers may be included in the composite cache key.

In a particular example, any or all of these optional components of the composite cache key, i.e. the request body and/or the request header(s) may be hashed by means of a hash function. This may advantageous in order to reduce the size of these elements and obtain a more compact composite cache key.

After the creation of the composite cache key, the generated composite cache key is compared with one or more composite cache keys previously stored at the CDN server. In other words, the created composite cache key of the incoming request is examined against each of the stored composite cache keys referring to past requests. Based on the result of this comparison, the delivery step follows one of two different paths.

If there is a match between the composite cache key and one of the previously stored composite cache key, i.e. the two keys are identical, it means that an identical request had already been received at the CDN server, which had then cached the corresponding response. It should be noted that the meaning of "identical request" depends on how the composite cache key is defined, as explained above.

For example, if the authentication token as a whole is used, two requests for the same resource from the same client at times separated by a period longer than the expiration period may not be considered "identical". On the other hand, if the expiration information of the authentication token is left out when forming the composite cache key, the two requests are considered "identical". Similarly, if the body of the request is included in the composite cache key, only requests having the same body can be considered "identical".

In case of a positive match, the CDN server delivers the response associated to the composite cache key to the client. In particular, the cached response comprises the restricted-access resource if access is allowed to the requested resource. Otherwise, the response comprises a refusal of the request.

If there is no match between the composite cache key and one of the previously stored composite cache key, the delivery step follows a different path including a retrieval step. The retrieval step comprises forwarding, by the CDN server, the request to the origin server and checking, by the origin server, whether the authentication token allows access to the restricted-access resource. The process of checking the authorization of the client, i.e. whether access to the restricted-access resource is to be granted, is performed by the origin server according to any known authorization mechanism, involving e.g. communicating with a Sterling external authentication and/or lightweight directory access protocol (LDAP) servers.

If the authorization check has a positive outcome, i.e. access to the restricted-access resource is allowed, the origin server retrieves the restricted-access resource as requested. In other words, the origin server obtains the resource as identified by the resource identifier, either fetching it from a storage or dynamically generating it. In particular, the restricted-access resource may be a resource generated by a server-side application, exemplarily by dynamically evaluating the resource on the basis of data contained in the request body and/or header.

In one example, the server-side application may evaluate a set of mathematical functions (i.e. the variable resource) to obtain a numerical value on the basis of an input provided by the client. The mathematical functions may be derived from a mathematical tool for machine learning and may provide a detection and/or a prediction about a state of the physical system. Examples of detection may include, but are not limited to, face recognition, character recognition, mechanical wear evaluation, emotion detection in vocal expressions. Examples of prediction may include, but are not limited to, forecasting battery duration, prognosticating failure of a component, predicting a change in the state of the physical system.

In particular, the set of mathematical functions may be obtained as described in EP application 20 160 989, which is hereby incorporated by reference. Indeed, in one example, the method may further comprise retrieving a mathematical tool for machine learning, wherein the mathematical tool processes a plurality of input values to provide one or more output values; converting the mathematical tool into one or more mathematical functions, wherein each mathematical function maps the plurality of input values to a function value that coincides with one of the one or more output values; and applying at least one patch to at least one of the one or more mathematical functions, wherein the at least one patch comprises at least one mathematical expression that affects the function value of the at least one patched mathematical function.

Another example for restricted-access resources may be confidential information in personnel profiles, which may be only accessible to human resources members.

Afterwards, the origin server sends a response comprising the restricted-access resource to the CDN server. The response may further comprise the HTTP code 200. If the access is not allowed, the response sent by the origin server comprises a refusal of the request, e.g. a HTTP code such as 401 or 403.

Independently of the content of the response of the origin server, the CDN server stores the response in association to the composite cache key. In other words, the CDN server caches the response in order to be able to service future identical requests. Finally, the CDN server delivers the response to the client.

In a particular example, the method may further comprise verifying, by the CDN server, the validity of the authentication token after receiving the request, and the delivery step may only be performed if the authentication token is valid.

The authentication token may comprise one or more features that lend themselves to verification of the validity of the authentication token, in order to prevent access from malicious agents, who may try to counterfeit or illicitly modify an authentication token. If any of these one or more features does not pass the verification process (denoted also as validation process), the authentication token is considered invalid and the CDN server may refuse the request of the client. In this case, no delivery step is performed.

For example, if the authentication token is a JWT, verifying the validity of the JWT may comprise any of the following or a combination thereof: checking the signature, checking that it is well formed, checking the claims. In particular, checking the claims may comprise verifying that the expiration time is after the current time and that the issuing authority matches a predetermined issuing authority, i.e. it is whitelisted.

In other examples, the identity of the issuing authority may be considered to be relevant for the authorization and may be, thus, verified by the origin server as part of the authorization check. In these cases, the identity of the issuing authority (e.g. the "iss" claim for a JWT) may be included in the composite cache key. Verifying whether the issuing authority is whitelisted as part of the validation of the token by the CDN server instead of as part of the authorization check by the origin server makes the authorization process more efficient.

In a particular example, the method may further comprise generating, by the origin server, the authentication token and sending the authentication token to the client; and verifying the validity of the authentication token may comprise retrieving, by the CDN server, verification data from the origin server.

As already mentioned, the origin server may for example generate the authentication token in response to a log-in request of the client. When the authentication token is provided by the origin server to the client, the verification of the validity may be carried out by the CDN server after having retrieved verification data from origin server. These verification data may be constraints on some features of the token or, more generally, may be the basis of verification process.

In the example of the JWT, the verification data may include the public key or the secret necessary to verify the signature.

If the validation data from the origin server are necessary to verify the validity of the authentication token, each validation would require involving the origin server. In order to avoid this, in some examples, the method may further comprise storing, by the CDN server, the verification data. In other words, also the validation data may be cached at the CDN server in order to avoid introducing latency.

To summarize, according to the method described above, requests from a client for a restricted-access resource are identified at CDN servers by means of a composite cache key including at least part of an authentication token. For first-time requests, the authorization of the client is checked. For subsequent requests, the response can be provided directly by the CDN server by relying upon the already-performed check, thereby eliminating the need for the authorization check, which is a lengthy procedure. Accordingly, requests can be serviced more efficiently while still maintaining the security of the process.

The absence of subsequent authorization checks may conflict with a possible change in the client's authorization to the resource at the origin server. For example, the origin server might start denying access to a resource, but, as long as the resource is still cached in the CDN network, it will still be accessible from the CDN server. In order to avoid such an issue, when the origin server is known to change permissions, a cache invalidation may be triggered at the CDN network for all the cache entries that are associated with a certain authentication token.

Another aspect of the present invention relates to a computer program product comprising computer-readable instructions, which, when executed by a computer, cause the computer to carry out the method as described above.

Yet another aspect of the present invention relates to a computing system for delivering restricted-access resources hosted on an origin server using a content delivery network—CDN, the computing system comprising the origin server, a plurality of CDN servers and at least one client, wherein:

a CDN server of the plurality of CDN servers is configured to receive a request for a restricted-access resource hosted on the origin server from the at least one client, wherein the request comprises a resource identifier of the restricted-access resource and an authentication token;

and the computing system is configured to perform a delivery step comprising:

creating, by the CDN server, a composite cache key comprising the resource identifier and at least part of the authentication token;

comparing, by the CDN server, the composite cache key with one or more composite cache keys previously stored at the CDN server;

if a match between the composite cache key and one of the previously stored composite cache key is found, delivering, by the CDN server, a response associated to the composite cache key to the client;

if no match between the composite cache key and one of the previously stored composite cache key is found, performing a retrieval step comprising:

forwarding, by the CDN server, the request to the origin server;

checking, by the origin server, whether the authentication token allows access to the restricted-access resource;

if the access is allowed:

retrieving, by the origin server, the restricted-access resource;

sending, by the origin server, a response comprising the restricted-access resource to the CDN server;

if the access is not allowed:

sending, by the origin server, a response comprising a refusal of the request to the CDN server;

storing, by the CDN server, the response in association to the composite cache key;

delivering, by the CDN server, the response to the client.

In other words, the system is a distributed system configured to implement the method described above. Each element of the system, i.e. the origin server, each CDN server and each client, may be a computing device or a computing system.

In some examples, the computing system may comprise a plurality of clients, in particular at least two clients. The first client may be configured to perform the operations described above. The second client may be configured to provide the resource to the origin server, e.g. a variable resource that is evaluated by the server-side application to dynamically generate the resource requested by the first client. Exemplarily, prior to the beginning of the delivery method, the second client may send the resource, e.g. a plurality of mathematical functions, to the origin server. In another example, a single client may combine the functionalities of the first client and the second client.

In this exemplary system, the origin server acts as an intermediary between the first client and the second client. Indeed, the second client is configured to send the resource to the origin server and the first client is configured to send one or more input values to the origin server/CDN server and to receive the corresponding resource (i.e. the resource as evaluated based on the input values).

The second client may belong to a provider company that has developed a set of mathematical functions derived from an artificial neural network (ANN) algorithm, e.g. for predicting battery discharge, and the first client may belong to a consumer company that employs and/or produces battery-powered devices, such as drones. The provider company may not want to disclose the mathematical functions to any consumer company and the consumer company may want to keep physical system-related data confidential. This can be achieved by using the origin server together with the CDN as "middle man" and using secure communication channels.

BRIEF DESCRIPTION OF THE DRAWINGS

Details of exemplary embodiments are set forth below with reference to the exemplary drawings. Other features will be apparent from the description, the drawings, and from the claims. It should be understood, however, that even though embodiments are separately described, single features of different embodiments may be combined to further embodiments.

DETAILED DESCRIPTION

In the following, a detailed description of examples will be given with reference to the drawings. It should be understood that various modifications to the examples may be made. Unless explicitly indicated otherwise, elements of one example may be combined and used in other examples to form new examples.

Figure 1:
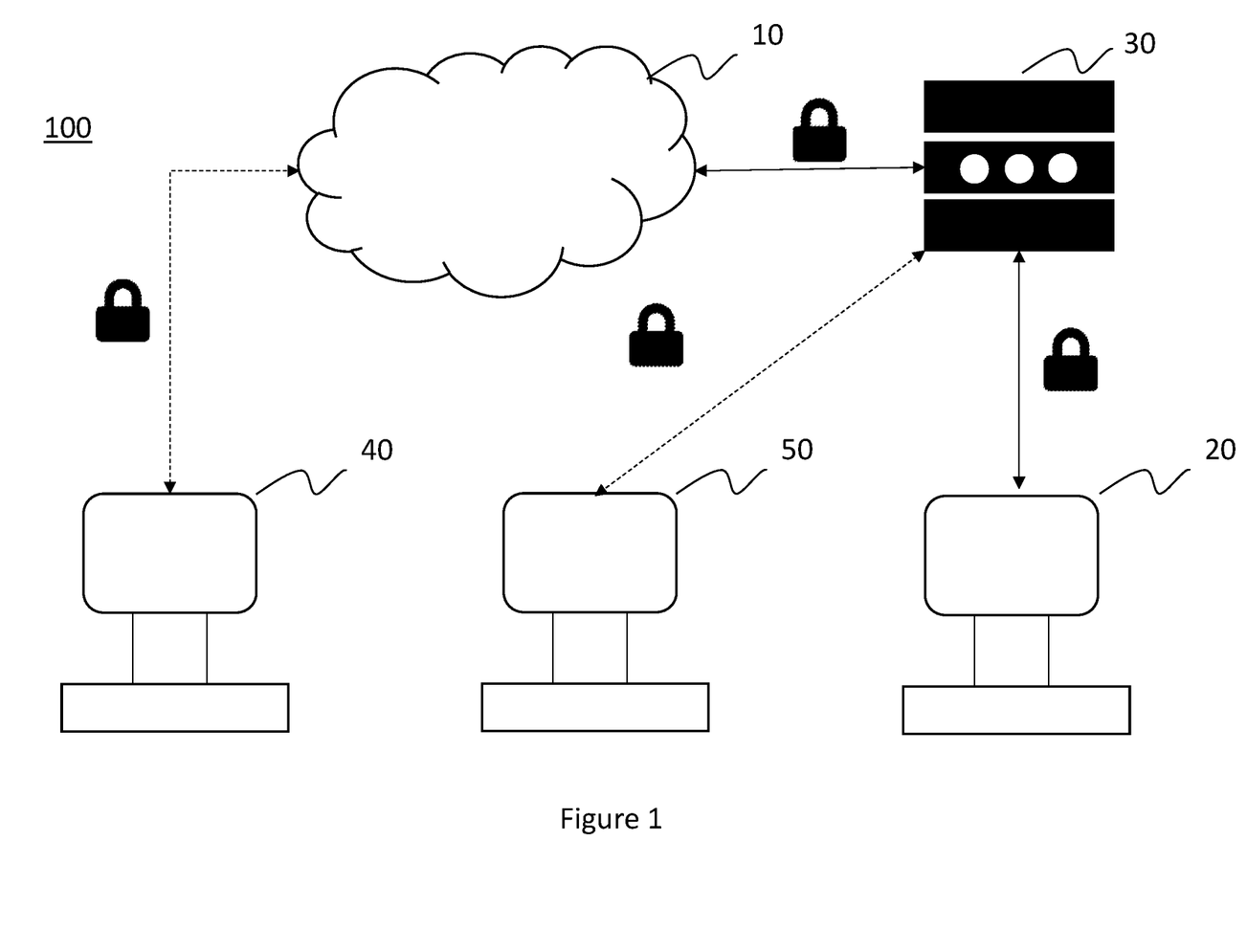
FIG. 1 shows a block diagram of a system for delivering restricted-access resources hosted on an origin server using a CDN according to an example.

FIG. 1 shows a block diagram of a system for delivering restricted-access resources hosted on an origin server using a CDN according to an example.

The system 100 comprises an origin server 10, a (first) client 20 and a plurality of CDN servers 30, which may be collectively referred to as "computing components". In particular, the origin server 10 and/or the CDN servers 30 may be a cloud computing environment, while the client 20 may be an on-premises computing environment. The communications between the computing components may be made secure by means of encryption.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

A cloud computing environment (i.e., cloud environment or cloud) may have one or more of the following characteristics: scalability, multitenancy, performance monitoring, virtual resources that are dynamically assignable to different users according to demand, multiple redundant sites, multiple virtual machines, as well as network accessibility (e.g., via. the Internet) from multiple locations (e.g., via a web browser) and devices (e.g., mobile device or PC).

In comparison to an on-premises computing environment, the cloud computing environment may have a higher ratio of virtual resources to physical resources (e.g., a higher ratio of virtual machines to physical machines). For example, the ratio of virtual resources (e.g., machines) to physical resources may be at least 10:1, at least 20:1 or at least 30:1 in the cloud computing environment. In contrast, an on-premises computing environment may have less than four virtual resources (e.g., machines) per physical resource.

The client 20 may store a web-based application that communicates with the server-side applications as specified in a RESTful API using HTTP. The client 20 may request restricted-access resources that are dynamically generated at the origin server 10. The CDN server 30 located closest to the client 20 mediates between the origin server 10 and the client 20, in particular by caching responses from the origin server 10 in order to service the client 20 more efficiently.

The system 100 may optionally further comprise clients 40, 50 beside the first client 20. A second client 40 may transmit resources to the origin server 10. A third client 50 may request restricted-access resources from the origin server 10, similarly to the first client 20. The system 100 may generally comprise a plurality of clients.

Figure 2:
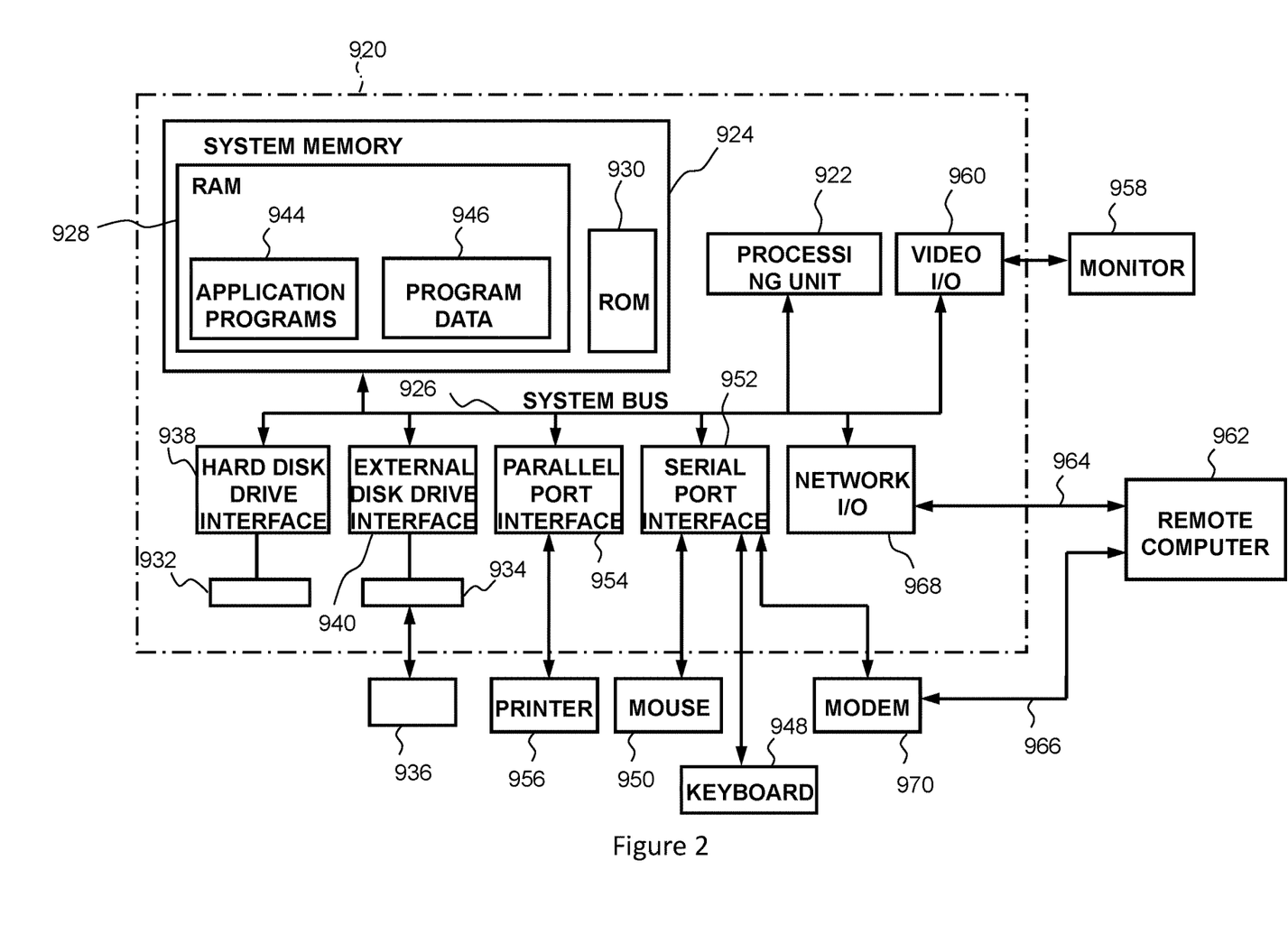
FIG. 2 shows an exemplary computing component.

FIG. 2 shows an exemplary general purpose computing component in the form of an on-premises computing environment 920 (e.g. a personal computer). The computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD-ROM for an optical disk drive. The hard disk drive 932 and the external disk drive 934 are connected to the system bus 926 by a hard disk drive interface 938 and an external disk drive interface 940, respectively. The drives and their associated computer-readable media provide non-volatile storage of computer readable instructions, data structures, program modules and other data for the personal computer 920. The relevant data may be organized in a database, for example a relational or object database.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

Figure 3:
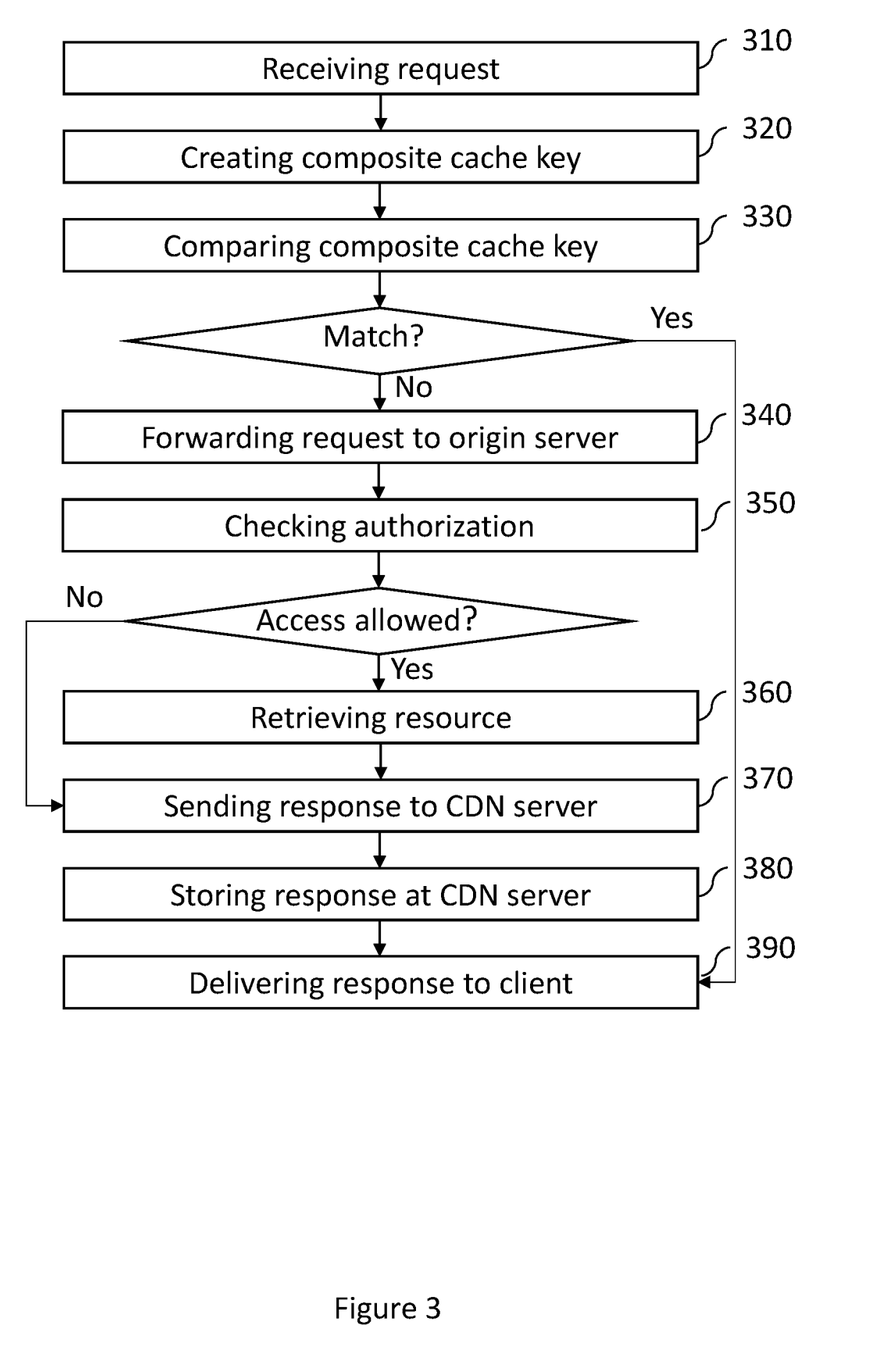
FIG. 3 shows a flow chart of a method for delivering restricted-access resources hosted on an origin server using a CDN according to an example.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIG. 3.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 2 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 2 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. In a networked environment, program modules depicted relative to the computing environment 920, or portions thereof, may be stored in a remote memory storage device resident on or accessible to remote computer 962. It will be appreciated that the network connections shown are exemplary and other means of establishing a communications link between the electronic devices may be used.

FIG. 3 shows a flow chart of a method for delivering restricted-access resources hosted on an origin server using a CDN according to an example. This method will be described also with reference to FIGS. 4 to 7.

The method comprises sending, by the client 20, a request for a restricted-access resource hosted at the origin server 10, which is received at 310 by a CDN server 30 in the CDN that is located closest to the client among all the CDN servers. The request comprises the URL of the resource and an authentication token (also referred to as "ID token") that identifies the client 20. The authentication token is a JWT in the examples of FIGS. 4 to 7.

Figure 4:
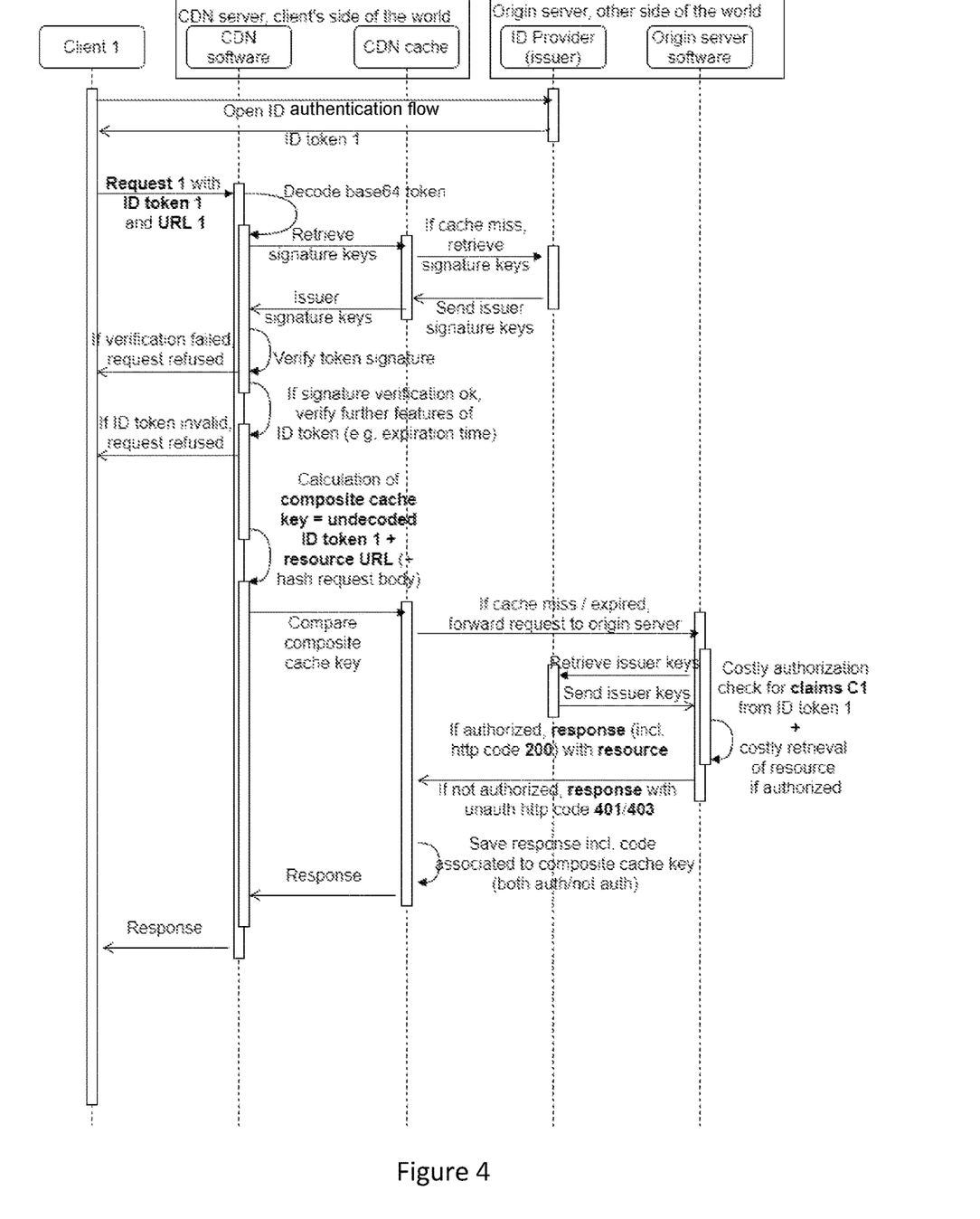
FIG. 4 shows an exemplary response delivery in the case of a cache miss.
Figure 6:
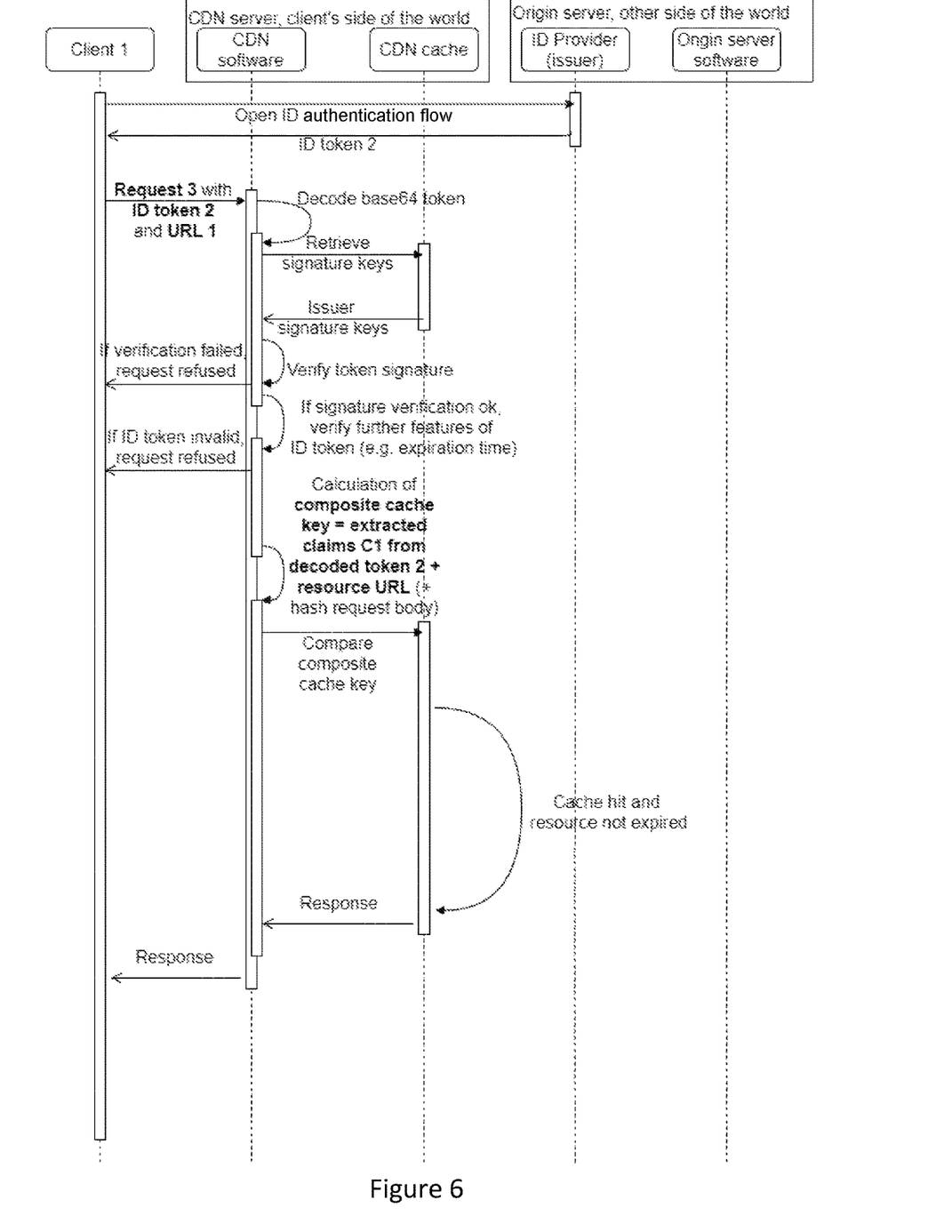
FIG. 6 shows another exemplary response delivery in the case of a cache hit.
Figure 7:
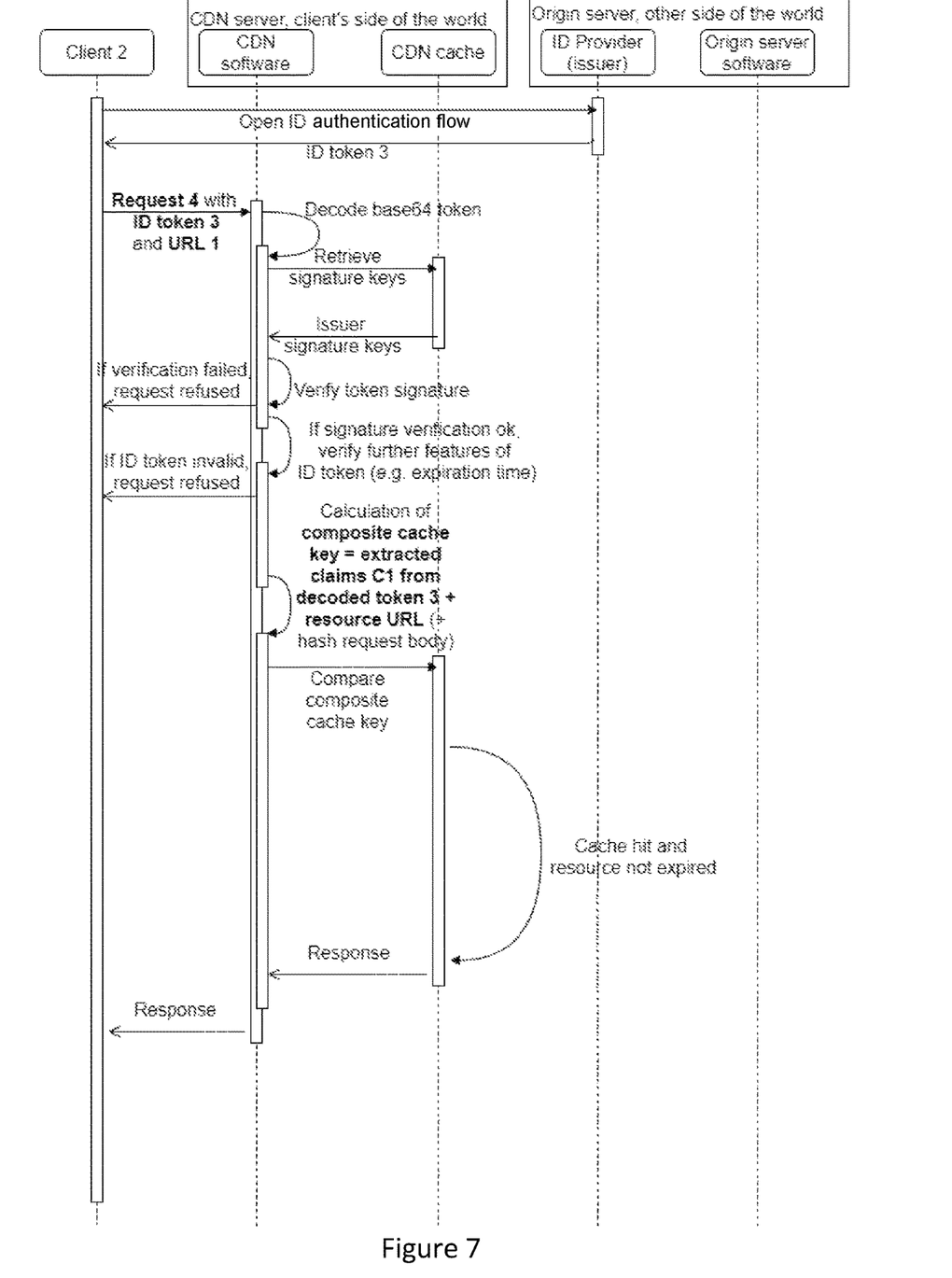
FIG. 7 shows yet another exemplary response delivery in the case of a cache hit.

Optionally, the authentication token may be generated by the origin server 10, which may comprise an ID provider or issuer for this purpose. The authentication token may be generated in the context of an Open ID authentication flow, as shown in FIGS. 4, 6 and 7.

After receiving 310 the request, the CDN server 30 may optionally initiate a verification procedure of the validity of the token, which may comprise checking the signature of a JWT as well as that the JWT is well formed, that it has not yet expired and that the ID provider is whitelisted, as shown in FIGS. 4 to 7. In particular, the signature may be verified first and only if the signature is valid, further features of the JWT may be checked. The verification procedure may comprise decoding the JWT.

Figure 5:
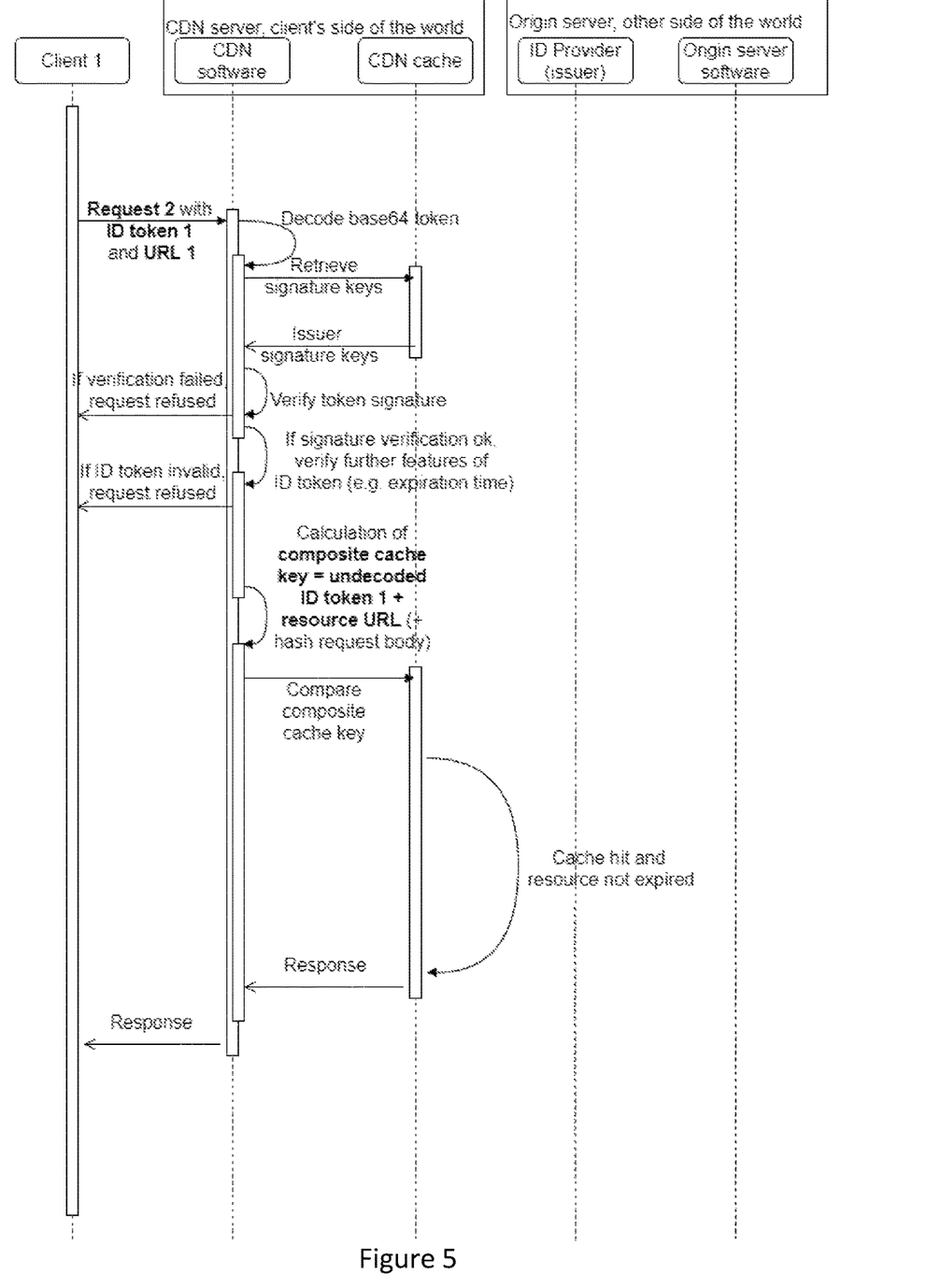
FIG. 5 shows an exemplary response delivery in the case of a cache hit.

In order to check the JWT signature, the CDN server 30 may need the public key of the issuer (also referred to as "issuer signature key"). The CDN cache may be configured to cache this public key, so that the verification procedure can be completed by the CDN server 30 without involving the origin server 10, as shown in FIGS. 5, 6 and 7. However, if the public key has not yet been cached, the CDN server 30 retrieves the public key from the ID provider at the origin server 10, as shown in FIG. 4.

Once the integrity of the payload as well as the fact that the authentication token has been issued by the ID provider are confirmed, the CDN server 30 may check that the JWT has the expected format and that the expiration time is after the current time. Further, the CDN server 30 may check whether the ID provider is whitelisted.

After having received 310 the request and optionally having verified the validity of the authentication token, the CDN server 30 creates a composite cache key at 320, which comprises at least part of the authentication token and the resource URL. Optionally, the composite cache key can comprise the body of the HTTP request, e.g. in the case of a POST request.

Figure 8:
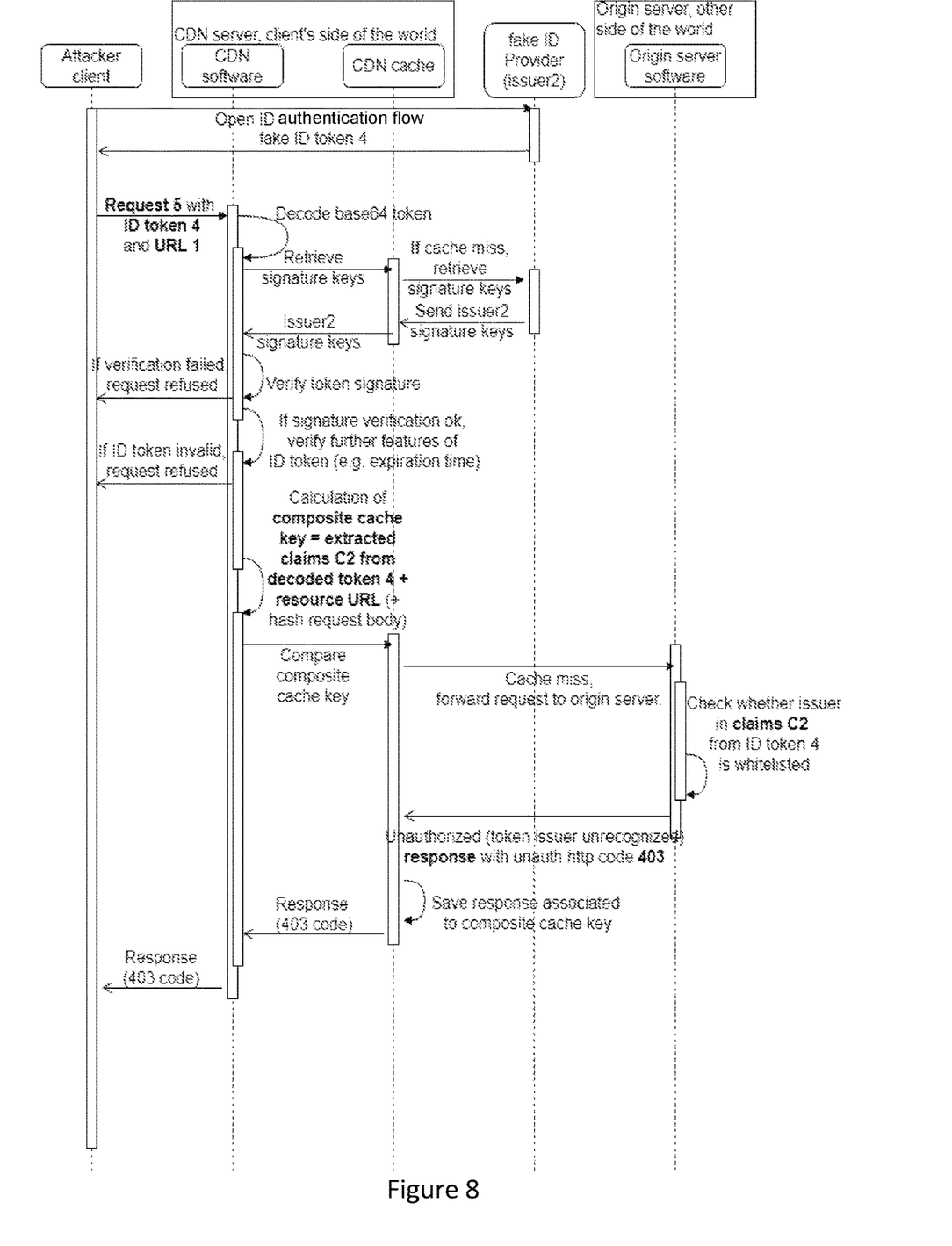
FIG. 8 shows an exemplary response to an unauthorized request.

In the examples shown in FIGS. 4 and 5, the composite cache key comprises the undecoded JWT and the resource URL. In the examples shown in FIGS. 6 and 7, the composite cache key comprises the claims of the decoded JWT and the resource URL. In particular, the claims that are used for the composite cache key may be the "sub" and/or "aud" registered claims. Additionally or alternatively, private claims such as "employeeID" and "department" may be used. In the example of FIG. 8, discussed below, the composite cache key comprises the "iss" registered claim.

At 330 the CDN server 30 compares the composite cache key generated at 320 from the request received from the client 20 at 310 with the content of the CDN cache, in particular with other composite cache keys that may be already stored therein. In other words, the CDN server 30 determines whether the created composite cache key matches any of the cached composite cache keys.

If there is no match, i.e. a cache miss occurs, the CDN server 30 forwards at 340 the request of the client to the origin server 10. This scenario is shown in the example of FIG. 4. The origin server 10 checks at 350 whether the client as identified by the authentication token is authorized to access the requested resource. The authorization check may include, among other things, retrieving the issuer signature key from the ID provider.

The authorization check is a costly process in terms of time and computing resources utilized. Similarly, the retrieval of the resource in case of authorized access may be costly as well.

If the client 20 is authorized to access the restricted-access resource, the origin server 10 retrieves 360 the resource and sends 370 a response to the CDN server 30 that includes the resource. Otherwise, the method proceeds from 350 directly to 370 and the response sent to the CDN server 30 includes a refusal of the request, e.g. an HTTP code 401 or 403.

Irrespectively of the content of the response received from the origin server 10, the CDN server 30 stores at 380 the response in the CDN cache in association with the relative composite cache key. In other words, the response is cached together with the composite cache key, wherein the composite cache key has the role of identifier of the request that has elicited such a response. In this way, future identical requests that would receive the same response from the origin server 10 can receive it directly from the CDN server 30.

After the CDN server 30 has received the response from the origin server 10, it forwards it to the client 20 at 390. The delivered response will contain the requested resource if the client 20 was authorized.

If there is a match, i.e. a cache hit occurs when comparing at 330 (as shown in FIGS. 5 to 7), the method proceeds directly to 390, namely to delivering the response associated with that composite cache key, as obtained from the CDN cache. As already mentioned, the content of the response may include the resource or not, depending on whether the client is authorized. A specific case of unauthorized client will be discussed with reference to FIG. 8 below.

Further to what already discussed above, FIGS. 4 to 7 will be described with reference to an exemplary temporal relation among them.

In the example of FIG. 4, a first request (request 1) comprising authentication token 1 and URL 1 is sent by the first client 20. The JWT 1 contains some claims, among which the claims C1 are those necessary for the authorization check (also referred to as "authorization JWT claims"). The CDN server 30 creates a composite cache key using the undecoded JWT 1 and the URL 1, and optionally a hash of the request body. In particular, the request body has to be included when it affects the resource that would be returned by the origin server 10. The composite cache key is for example a string of text.

In the case of FIG. 4, the CDN cache does not contain a match for the composite cache key based on JWT 1 and URL 1, so the CDN server 30 cannot directly service the first client 20 but has to forward the request to the origin server 10. The origin server 10 performs the authorization check based on the claims C1 in the JWT 1 and, if the outcome is positive, retrieves the requested resource, e.g. dynamically evaluating it by means of a server-side application. Afterwards, the response gets cached by the CDN server 30 as corresponding to the composite cache key generated from request 1 and finally delivered to the first client 20.

The scenario of FIG. 4 has a high latency, because the request of the client 20 has to be forwarded to the origin server 10, which is located farther away than the CDN server 30.

In the scenario of FIG. 5, the same first client 20 sends a second request (request 2) at a point in time subsequent to the time of request 1. The second request is identical to the first request, in that it comprises the same ID token JWT 1, the same URL 1 and, if present, the same body. The CDN server 30 creates a composite cache key based on request 2, i.e. using the undecoded JWT 1, the URL 1 and optionally the request body. This "request 2-composite cache key" is then compared against the composite cache keys already stored in the CDN cache. Since the authentication token and the resource identifier are the same for both requests 1 and 2, the composite cache keys created as explained above will be a match. Accordingly, the CDN server 30 will provide the first client 20 with the response that it had cached previously in the context of request 1. Therefore, the latency is reduced.

If, in the scenario of FIG. 4, the composite cache key is modified to include not the undecoded JWT as a whole but only the claims C1 necessary for the authorization check, the frequency of occurrence of a cache hit at the CDN server 30 can be increased. In other words, a greater number of requests can be serviced directly by the CDN server 30, as shown in FIGS. 6 and 7.

In the scenario of FIG. 6, the first client 20 has a new ID token, JWT 2. The details of the client (e.g. which user is logged in) have not changed with respect to the token JWT 1, so that the authorization JWT claims are the same, i.e. authorization JWT claims C1. However, the new token, JWT 2, may differ from JWT 1 in other aspects, e.g. have a different expiration time. The first client 20 sends a third request (request 3) at a point in time subsequent to the time of request 1 for the same resource URL 1. Even if the expiration time of JWT 2 is different, since the composite cache key is created using only the authorization JWT claims C1 together with the URL 1 (and optionally the request body), there will be a cache hit at the CDN cache for request 3 in virtue of previous request 1.

The same happens in the scenario of FIG. 7, in which a second client 50 sends a fourth request (request 4) at a point in time subsequent to the time of request 1 for the same resource URL 1. Request 4 includes an ID token, JWT 3, that authenticates the second client 50. The second client 50 may have the same privileges as the first client 40, so that JWT 3 contains the same authorization JWT claims C1. Accordingly, even for a different client, the response to the request, potentially including the desired resource, can be efficiently delivered.

In the examples of FIGS. 4 to 7, checking whether the issuing authority is whitelisted (i.e. considered legitimated) is part of the verification of the validity of the ID token, which is performed by the CDN server. In these cases, a request from a malicious client with a fake ID token from a not legitimate (or fake) ID provider would be refused by the CDN server, since the ID token is found to be invalid.

In alternative examples, checking whether the issuing authority is whitelisted may be part of the authorization check by the origin server. FIG. 8 shows an exemplary response to an unauthorized request when the legitimacy of the issuing authority is checked by the origin server. In this case, the client 20 is malicious, e.g. an attacker client that tries to illicitly obtain the restricted-access resource identified by URL 1. The attacker client cannot obtain a legitimate ID token, so it gets a fake ID token from a not legitimate (or fake) ID provider (issuer2), JWT 4. The fake ID token may for example try to replicate a stolen combination of user ID and assigned roles in the claims, e.g. in the "sub" claim. However, since issuer2 is different from the legitimate ID provider, the "iss" claim of JWT 4 will be different from the "iss" claim of JWT 1. Thus, as a whole, the authentication claims C2 of JWT 4 are different from authentication claims C1.

The attacker client sends a fourth request (request 4) at a point in time subsequent to the time of request 1 for the same resource URL 1. In this case, if the verification of the validity of the authentication token is performed, the CDN server 30 would have to retrieve the signature keys of the fake ID provider, which are not cached (assuming this is the first attempt of the attacker client).

The composite cache key for request 4 is, thus, given by the authorization JWT claims C2 and the URL 1 (and optionally the body). As mentioned above, in this example the authorization JWT claims comprise the "iss" claim, i.e. a claim identifying the ID provider. Such a composite cache key does not match the cached composite cache key associated to request 1, even if e.g. the user ID and assigned roles are the same. Thus, there is a cache miss and the CDN server 30 forwards the request to the origin server 10, which checks first whether the token has been issued by a legitimate, i.e. whitelisted, ID provider. If the ID provider identified in the "iss" claim is not recognized because it is not whitelisted, the origin server 10 does not even perform the whole, costly authorization check, but can directly refuse the request.

This is the case for issuer2 as identified in the authorization JWT claims C2, as mentioned above, so that access to the resource is denied and the origin server 10 sends to the CDN server 30 a response containing HTTP code 403. This response gets stored at the CDN cache and then forwarded to the attacker client.

Therefore, irrespectively of the stage at which the identity of the ID provider is checked, the method illustrated herein, exemplarily with reference to FIGS. 3 to 8, is secure.

What is claimed is:

1. A computer-implemented method for delivering restricted-access resources hosted on an origin server using a content delivery network (CDN) comprising a plurality of CDN servers, the method comprising:
   receiving, by a CDN server from a client, a request for a restricted-access resource hosted on the origin server, wherein the request comprises a resource identifier of the restricted-access resource and an authentication token, the authentication token comprising one or more access credentials and expiration information; and
   performing a delivery step comprising:
      creating, by the CDN server, a composite cache key comprising the resource identifier and the one or more access credentials of the authentication token, the composite cache key excluding the expiration information of the authentication token;
      comparing, by the CDN server, the composite cache key with one or more composite cache keys previously stored at the CDN server;
      determining whether a match between the composite cache key and one of the previously stored composite cache keys is found, wherein
         responsive to the match between the composite cache key and one of the previously stored composite cache keys being found, delivering, by the CDN server, a first response message associated with the composite cache key to the client; and
         responsive to the match between the composite cache key and one of the previously stored composite cache keys is not being found, performing a retrieval step comprising:
            forwarding, by the CDN server, the request to the origin server; and
            checking, by the origin server, whether the authentication token allows access to the restricted-access resource;
            responsive to determining that the access is allowed:
               retrieving, by the origin server, the restricted-access resource; and
               sending, by the origin server, a second response message comprising the restricted-access resource to the CDN server; and
            responsive to determining that the access is not allowed, sending, by the origin server, a third response message comprising a refusal of the request to the CDN server;
         storing, by the CDN server, in association to the composite cache key, the second response message in response to determining that the access is allowed, or the third response message in response to determining that the access is not allowed; and
         delivering, by the CDN server, the second response message or the third response message to the client.

2. The computer-implemented method of claim 1, further comprising verifying, by the CDN server, the validity of the authentication token after receiving the request, and wherein the delivery step is only performed if the authentication token is valid.

3. The computer-implemented method of claim 2, further comprising:
   generating, by the origin server, the authentication token and sending the authentication token to the client; and
   wherein verifying the validity of the authentication token comprises retrieving, by the CDN server, verification data from the origin server.

4. The computer-implemented method of claim 3, further comprising storing, by the CDN server, the verification data.

5. The computer-implemented method of claim 4, wherein:
   the request is an hypertext transfer protocol request comprising a body and the composite cache key further comprises the body.

6. A computer program product comprising computer-readable instructions, which, when executed by a content delivery network (CDN) server, cause the CDN server to:
   receive, from a client, a request for a restricted-access resource hosted on an origin server, wherein the request comprises a resource identifier of the restricted-access resource and an authentication token, the authentication token comprising one or more access credentials and expiration information; and
   perform a delivery step comprising:
      create a composite cache key comprising the resource identifier and the one or more access credentials of the authentication token, the composite cache key excluding the expiration information of the authentication token;
      compare the composite cache key with one or more composite cache keys previously stored at the CDN server;
      determine whether a match between the composite cache key and one of the previously stored composite cache keys is found, wherein
         responsive to the match between the composite cache key and one of the previously stored composite cache keys being found, deliver a first response message associated with the composite cache key to the client; and
         responsive to the match between the composite cache key and one of the previously stored composite cache keys not being found, forward the request to the origin server, where the origin server:
            checks whether the authentication token allows access to the restricted-access resource;
            responsive to determining that if the access is allowed:
               retrieves the restricted-access resource; and
               sends a second response message comprising the restricted-access resource to the CDN server; and
            responsive to determining that if the access is not allowed, sends a third response message comprising a refusal of the request to the CDN server;
         store, in association to the composite cache key, the second response in response to determining that the access is allowed, or the third response message in response to determining that the access is not allowed; and deliver the second response message or the third response message to the client.

7. The computer program product of claim 6, the computer-readable instructions, which, when executed by the CDN server, cause the CDN server to verify the validity of the authentication token after receiving the request, and wherein the delivery step is only performed if the authentication token is valid.

8. The computer program product of claim 7, the computer-readable instructions, which, when executed by the CDN server, cause the CDN server to generate, by the origin server, the authentication token and sending the authentication token to the client; and wherein verifying the validity of the authentication token comprises retrieving, by the CDN server, verification data from the origin server.

9. The computer program product of claim 8, the computer-readable instructions, which, when executed by the CDN server, cause the CDN server to store the verification data.

10. The computer program product of claim 9, wherein:
the request is an hypertext transfer protocol request comprising a body and the composite cache key further comprises the body.

11. A computing system for delivering restricted-access resources hosted on an origin server using a content delivery network (CDN), the computing system comprising the origin server, a plurality of CDN servers and at least one client, wherein:

a CDN server of the plurality of CDN servers is configured to receive a request for a restricted-access resource hosted on the origin server from the at least one client, wherein the request comprises a resource identifier of the restricted-access resource and an authentication token, the authentication token comprising one or more access credentials and expiration information; and the computing system is configured to perform a delivery step comprising:

creating, by the CDN server, a composite cache key comprising the resource identifier and the one or more access credentials of the authentication token, the composite cache key excluding the expiration information of the authentication token;

comparing, by the CDN server, the composite cache key with one or more composite cache keys previously stored at the CDN server;

determining whether a match between the composite cache key and one of the previously stored composite cache keys is found, wherein responsive to the match between the composite cache key and one of the previously stored composite cache keys being found, delivering, by the CDN server, a first response message associated with the composite cache key to the client; and responsive to the match between the composite cache key and one of the previously stored composite cache keys not being found, performing a retrieval step comprising:

forwarding, by the CDN server, the request to the origin server;

checking, by the origin server, whether the authentication token allows access to the restricted-access resource;

responsive to determining that the access is allowed:
retrieving, by the origin server, the restricted-access resource; and sending, by the origin server, a second response message comprising the restricted-access resource to the CDN server; and responsive to determining that the access is not allowed, sending, by the origin server, a third response message comprising a refusal of the request to the CDN server;

storing, by the CDN server, in association to the composite cache key, the second response in response to determining that the access is allowed, or the third response message in response to determining that the access is not allowed; and delivering, by the CDN server, the second response message or the third response message to the client.

12. The system of claim 11, wherein the CDN server is further configured to verify the validity of the authentication token after receiving the request, and wherein the system is configured to perform the delivery step only if the authentication token is valid.

13. The system of claim 12, wherein the origin server is further configured to generate the authentication token and send the authentication token to the client; and wherein the CDN server is further configured to retrieve verification data from the origin server.

14. The system of claim 13, wherein the CDN server is further configured to store the verification data.

15. The system of claim 14, wherein the request is an hypertext transfer protocol request comprising a body and the composite cache key further comprises the body.

* * * * *